(12) United States Patent
Saitou et al.

(10) Patent No.: US 7,355,835 B2
(45) Date of Patent: Apr. 8, 2008

(54) STACKED CAPACITOR AND METHOD OF FABRICATING THE SAME

(75) Inventors: Takeshi Saitou, Miyagi (JP); Hitoshi Takata, Miyagi (JP); Katsuhiro Yoshida, Miyagi (JP)

(73) Assignee: NEC TOKIN Corporation, Miyagi (JP)

( * ) Notice: Subject to any disclaimer, the term of this patent is extended or adjusted under 35 U.S.C. 154(b) by 116 days.

(21) Appl. No.: 11/437,488

(22) Filed: May 20, 2006

(65) Prior Publication Data

US 2006/0262490 A1 Nov. 23, 2006

(30) Foreign Application Priority Data

May 20, 2005 (JP) ............... 2005-147708

(51) Int. Cl.
*H01G 4/30* (2006.01)
(52) U.S. Cl. ............... 361/301.4; 361/311; 361/313; 361/306.1; 361/306.3; 361/321.1; 361/308.1
(58) Field of Classification Search ......... 361/301.4, 361/306.1, 306.3, 311–313, 302–305, 321.2, 361/308–309, 301.1, 301.2
See application file for complete search history.

(56) References Cited

U.S. PATENT DOCUMENTS 5,870,273 A * 2/1999 Sogabe et al. ........... 361/306.3

| 6,208,501 | B1 * | 3/2001 | Ingalls et al. | 361/303 |
| 6,310,759 | B2 * | 10/2001 | Ishigaki et al. | 361/309 |
| 6,418,007 | B1 * | 7/2002 | Lacy et al. | 361/301.1 |
| 6,418,009 | B1 * | 7/2002 | Brunette | 361/306.3 |
| 6,515,842 | B1 * | 2/2003 | Hayworth et al. | 361/303 |
| 6,816,356 | B2 * | 11/2004 | Devoe et al. | 361/309 |

FOREIGN PATENT DOCUMENTS

JP 2004-015706 A 1/2004
JP 2004-158577 A 6/2004

* cited by examiner

*Primary Examiner*—Nguyen T. Ha
(74) *Attorney, Agent, or Firm*—Bradley N. Ruben

(57) ABSTRACT

A capacitor has stacking capacitor elements, each of which contains a conductor plate, a first band being an insulator and disposed around the plate, a second band being an insulator and disposed around the plate so as to be substantially parallel to the first band, an insulating coating covering a region sandwiched between the first and second bands, a cathode layer formed on the insulating coating, and an anode containing the plate and formed on an outer side of at least one of the first and second bands. The cathode layers are elctrically connected to each other through paths each connecting in series the facing two cathode layers of the adjacent two elements and path(s) connecting in parallel the cathode layers to each other, and the anodes are electrically connected to each other through path(s) connecting in parallel the anodes to each other.

23 Claims, 16 Drawing Sheets

STACKED CAPACITOR AND METHOD OF FABRICATING THE SAME

This application claims priority to prior Japanese patent application JP 2005-147708, the disclosure of which is incorporated herein by reference.

BACKGROUND OF THE INVENTION

This invention relates to a thin-type aluminum solid electrolytic capacitor using a flat-plate aluminum foil and a fabrication method thereof and, in particular, relates to an ultra-miniature, stacked large-capacity, and low-impedance thin-type aluminum solid electrolytic capacitor and a fabrication method thereof. This invention relates to a structure and a fabrication method of a stacked thin-type aluminum solid electrolytic capacitor using electrolytic capacitor aluminum foils and having low impedance characteristics.

Following miniaturization, speed-up, and digitization of electronic devices in recent years, there has been a strong demand for miniature large-capacity capacitors having excellent high-frequency characteristics of impedance also in the field of capacitors.

Capacitors that are used in a high frequency region have conventionally been mainly multilayer ceramic capacitors which, however, cannot satisfy need for reduction in size, increase in capacity, and reduction in impedance.

As large-capacity capacitors, there are electrolytic capacitors such as conventional aluminum electrolytic capacitors and tantalum solid electrolytic capacitors. However, electrolyte solutions or electrolytes (manganese dioxide etc.) used in those capacitors each have a high resistivity value ($1\Omega \cdot cm$ to $100\Omega \cdot cm$) and therefore it has been difficult to obtain a capacitor having a sufficiently low impedance in a high frequency region.

In recent years, however, there have been developed solid electrolytic capacitors each using a conductive polymer such as polypyrrole or polythiophen as a solid electrolyte. As compared with the conventional solid electrolyte in the form of a metal oxide semiconductor such as manganese dioxide, the solid electrolyte in the form of the conductive polymer has a smaller resistivity value ($0.01\Omega \cdot cm$ to $0.1\Omega \cdot cm$). An impedance value Z in a high frequency region is proportional to a resistivity value $\rho$ of a used electrolyte, that is, $Z \propto \rho$. Therefore, the solid electrolytic capacitor using the conductive polymer having the small resistivity value as the solid electrolyte can suppress the impedance value in the high frequency region to a lower value and thus those capacitors are now widely used.

As one example of an aluminum solid electrolytic capacitor using a conductive polymer as a solid electrolyte, a flat-plate element structure will be described. An anodic oxide coating layer is formed on the surfaces of a belt-shaped surface-roughened (etched) aluminum foil and a resist band made of an insulating resin such as epoxy resin is formed at a predetermined portion for defining an anode portion and a cathode portion. Thereafter, conductive polymer film is formed at a predetermined portion and then a graphite layer and a silver paste layer are formed on the conductive polymer film in the order named, thereby forming the cathode portion. Thereafter, the cathode portion and an external cathode terminal are connected together by the use of a silver paste. Since the anode portion defined by the resist band is in the form of the aluminum foil which is unsolderable, a solderable metal plate is electrically connected thereto by ultrasonic welding, electric resistance welding, laser welding, or the like.

On the other hand, in recent years, in order to achieve a large capacity and low impedance characteristics with a limited floor area, there is a stacked capacitor in which a plurality of aluminum solid electrolytic capacitor elements each using a conductive polymer as a solid electrolyte are stacked together, cathodes are bonded together by a conductive paste, and further, anode terminals are pierced and a conductive paste is applied to such a portion, thereby achieving electrical connection therebetween. Such example is disclosed in Japanese Unexamined Patent Application Publication (JP-A) No. 2004-158577, paragraphs 0011 to 0021 and FIG. 1.

Further, in order to achieve reduction in impedance in a high frequency region, there is also an aluminum solid electrolytic capacitor having a three-terminal structure in which both ends of a surface-roughened flat-plate aluminum base member of a certain size serve as anodes, a cathode with an electrolyte is provided at the center, and an insulating layer is formed between the cathode and each of the anodes. Japanese Unexamined Patent Application Publication (JP-A) No. 2004-15706, paragraphs 0023 to 0025 and FIG. 1 discloses such a tree-terminal structure capacitor.

In the stacked aluminum solid electrolytic capacitor, the contact resistance is generated due to connections between the anode terminals and between the cathode terminals that are formed by stacking the single-plate elements and, as the number of the stacked elements increases, the influence of resistivity of the conductive paste used for the connection increases. Therefore, it has been difficult to achieve reduction in impedance of the stacked aluminum solid electrolytic capacitor.

Further, in the conventional thin-type aluminum solid electrolytic capacitor using the flat-plate aluminum foil, there is a problem that as the element floor area decreases, the ratio of the cathode portion occupying the element floor area decreases. For example, in the case of a stacked aluminum solid electrolytic capacitor having an element floor of W(width)×L(length)=4.3×7.3(mm$^2$) or less, the ratio between an effective floor area (an area of a cathode portion occupying the element floor) and an element floor area, i.e. the effective floor area/element floor area, becomes about 60% or less. Further, when the floor area is W(width)×L(length)=2.8×3.5(mm$^2$) or W(width)×L(length)=1.6×3.2 (mm$^2$), the effective floor area/element floor area becomes about 50% or less. Therefore, the conventional structure is unsuitable for forming a miniature large-capacity stacked solid electrolytic capacitor.

SUMMARY OF THE INVENTION

In view of these circumstances, this invention provides a stacked capacitor that can suppress the influence of resistivity of a conductive paste connecting between capacitor elements even if the capacitor elements are multilayered and, as a result, that has a low impedance, and further provides a method of fabricating such a stacked capacitor.

Simultaneously, this invention provides a stacked capacitor having a structure wherein, even in the case of a small element floor area, the ratio of a cathode portion occupying the element floor area is not reduced, and further provides a method of fabricating such a stacked capacitor.

For solving the foregoing problems, this invention provides the following stacked capacitor and fabrication method thereof.

Specifically, there is provided a stacked capacitor formed by stacking a plurality of capacitor elements, wherein each of the capacitor elements comprises a conductor plate, a first band including an insulator and disposed around the conductor plate, a second band including an insulator and disposed around the conductor plate so as to be substantially parallel to the first band, an insulating coating covering a region of said conductor plate sandwiched between the first and second bands, a first electrode including an electrolytic material and formed on the insulating coating, and a second electrode including the conductor plate and formed on an outer side of at least one of the first and second bands, the first electrodes of the capacitor elements are electrically connected to each other through both of a first conductive path formed by adjoining the facing two first electrodes of the adjacent two capacitor elements and a second conductive path connecting in parallel the first electrodes of the plurality of capacitor elements to each other, and the second electrodes are electrically connected to each other through a third conductive path connecting in parallel the second electrodes to each other. Herein, the conductor plate is a metal foil such as an aluminum foil or a metal plate. The first and second bands are, for example, resists. The insulating coating is, for example, an aluminum oxide coating. The first, second, and third conductive paths are formed, for example, by a conductive paste.

The third conductive path preferably comprises metal bonding formed by welding between the second electrodes. By this, the impedance due to a resistance across the second electrodes can be reduced.

The second conductive path preferably comprises a conductive paste covering the first electrodes and a metal member covering at least part of the conductive paste. Particularly, if the metal member is a metal foil disposed around the conductor plate between the first and second bands, it is effective in terms of reducing the impedance.

Each of the first electrodes may have a conductive paste layer as an outermost layer. However, if the first electrode has a plating layer as an outermost layer instead of the conductive paste layer, it is effective for reducing the impedance.

Each of the capacitor elements may comprise a metal plate having at least one surface applied with plating and joined to at least one of the second electrodes, and the metal plate may be joined to the second electrode through its surface applied with the plating. By this, even if use is made of the conductor plate such as the aluminum foil that is difficult to solder, it is possible to provide the stacked capacitor with a terminal that is easy to solder, by adopting a proper material such as a copper plate as the metal plate. The plating may be applied to both surfaces of the metal plate. This eliminates necessity of selecting a surface to be joined when performing the welding operation and, thus, the operation is facilitated. As the plating, there is, for example, nickel plating or silver plating.

Instead of joining the metal plate applied with the plating, at least one of the second electrodes of each of the capacitor elements may be covered with evaporated metal film and, further, the evaporated metal film may be covered with plating. In the case of joining the metal plate applied with the plating, the welding step is required. As compared with this step, the step of performing the plating on the evaporated metal film is excellent in productivity.

The stacked capacitor of this invention may be any of two-terminal type, three-terminal type, and four-terminal type. In the case of, for example, four-terminal type, it is considered to provide two terminals electrically connected to the first electrode layers and two terminals electrically connected to the second electrodes.

Further, this invention provides a fabrication method of a stacked capacitor having a plurality of capacitor elements stacked together, comprising the steps of preparing the capacitor elements each including first band and a second band on a conductor plate covered with an insulating coating, the first band including an insulator and disposed around the conductor plate and the second band including an insulator and disposed around the conductor plate so as to be substantially parallel to the first band, a catode layer on the insulating coating between the first and second bands, and an anode including the conductor plate on an outer side of at least one of the first and second bands; forming a first conductive path by adjoining the facing two cathode layers of the adjacent two capacitor elements and a second conductive path connecting in parallel the cathode layers of the plurality of capacitor elements to each other; and forming a third conductive path connecting in parallel the anodes to each other.

The step of forming the third conductive path preferably comprises a step of forming metal bonding by welding between the anodes.

The step of forming the second conductive path preferably comprises a step of covering the cathode layers with a conductive paste and covering at least part of the conductive paste with a metal member. Further, if the metal member is a metal foil disposed around the conductor plate between the first and second bands, it is effective for reducing the impedance.

Each of the cathode layers may have, as its outermost layer, a conductive paste layer or a plating layer.

The preparing step may further comprise the steps of applying plating to at least one surface of a metal plate; and joining the metal plate to the anode through its surface applied with the plating. In this event, the plating may be applied to both surfaces of the metal plate. The plating is considered to be, for example, nickel plating or silver plating.

Alternatively, the preparing step may further comprise the steps of covering at least one of the cathode layers of each capacitor element with evaporated metal film; and covering the evaporated metal film with plating.

According to this invention, it is possible to provide a miniature, large-capacity, and low-impedance stacked capacitor having excellent high-frequency characteristics and further provide a method of fabricating such a stacked capacitor.

DESCRIPTION OF THE PREFERRED EMBODIMENT

Figure 1A:
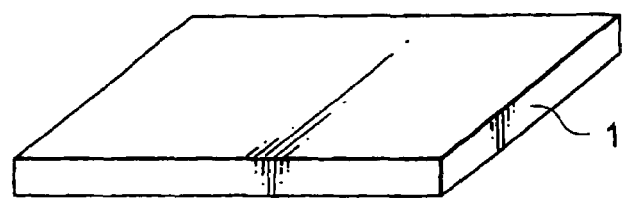
FIGS. 1A to 1E are perspective views for explaining a fabrication method of a capacitor element used in a stacked capacitor being one embodiment of this invention.

Referring to the drawings, description will be made about a fabrication method of a stacked capacitor according to an embodiment of this invention. For the sake of describing structures, the dimantional ratios of a metal foil, a resist band, and so on shown in figures do not necessarily agree with the actual ratios.

Referring to FIGS. 1A to 1E, description will be made about a method of fabricating a capacitor element used in the capacitor.

A metal foil (or a metal plate) 1 such as an aluminum foil is surface-roughened by etching and an insulating coating such as an oxide coating is formed on the surfaces of the metal foil to thereby obtain a chemically converted foil, or a foil with insulating coating, which is then cut into a chemically converted foil of a predetermined shape (FIG. 1A).

Figure 1B:
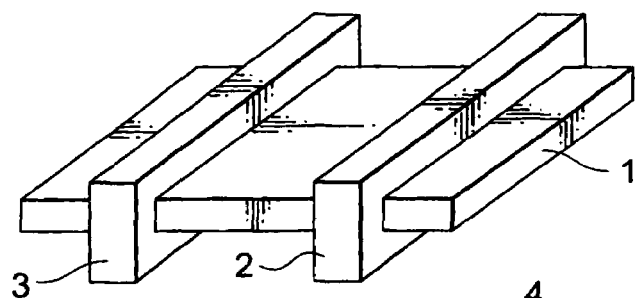

Then, resist bands 2 and 3 is formed on the surfaces of the foil 1 using an insulating resin, thereby defining anode portions and a cathode portion (FIG. 1B). As the insulating resin, use is made, for example, of an epoxy resin. In the illustrated example, the resist bands are formed so as to divide the chemically converted foil into three portions, i.e. both end portions (anode portions) and a center portion (cathode portion).

Figure 1C:
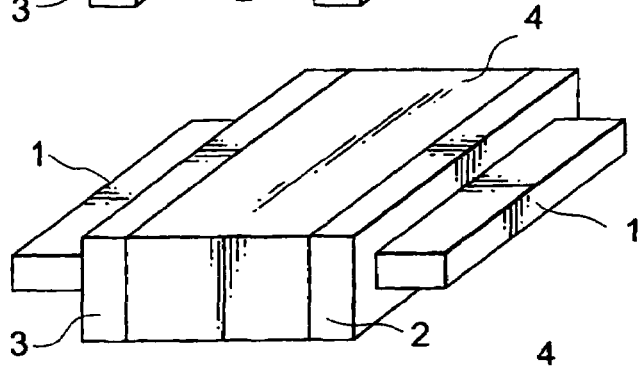

Then, an electrode layer 4, or a cathode layer, is formed at the cathode portion (FIG. 1C). The cathode electrode layer 4 is comprised of, for example, a conductive polymer layer to serve as a solid electrolyte, a graphite layer, and a conductive paste layer which are stacked in the order named.

Figure 1D:
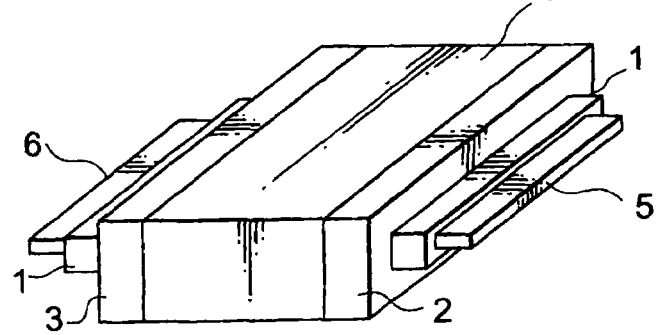

Then, the insulating coating is removed from both end portions of the chemically converted foil 1 by polishing or the like, thereby exposing the metals to forme anode electrodes 5 and 6 (FIG. 1D). In FIG. 1D, the insulating coating is removed from about a half position of each of the end portions projecting from the resist bands. However, the insulating coating may be removed entirely from each of the end portions.

Figure 1E:
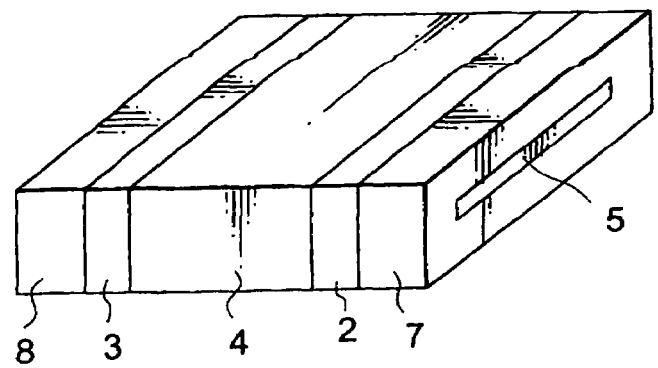

Finally, the end portions are covered with conductive paste layers 7 and 8 so that the entire capacitor element including the end portions is formed into a rectangular parallelepiped (FIG. 1E). In this event, end surfaces of the electrodes 5 and 6 are exposed.

Figure 2A:
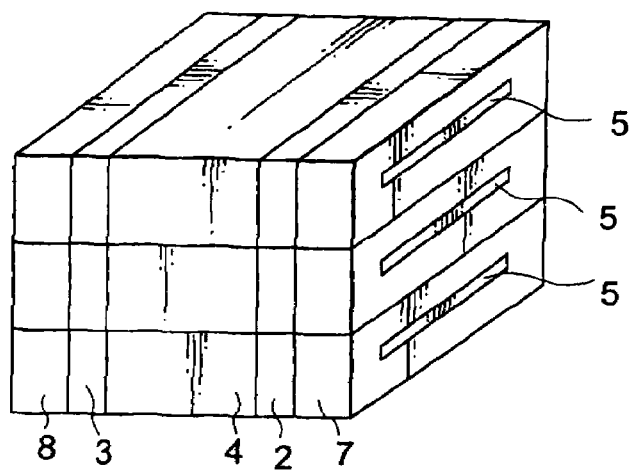
FIGS. 2A to 2C are perspective views for explaining the process of fabricating the stacked capacitor by stacking capacitor elements each being the same as that shown in FIG. 1E.
Figure 2B:
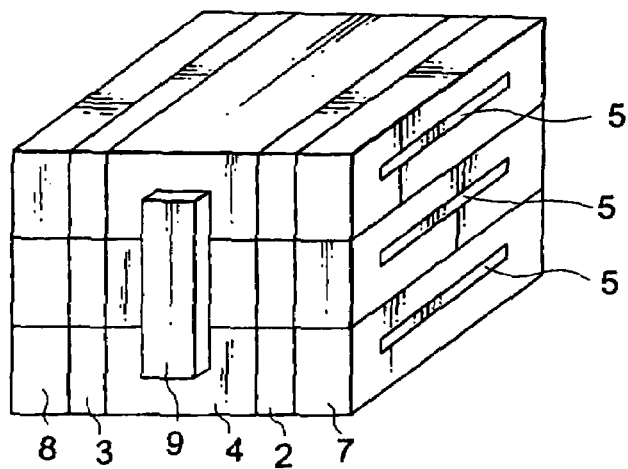
Figure 2C:
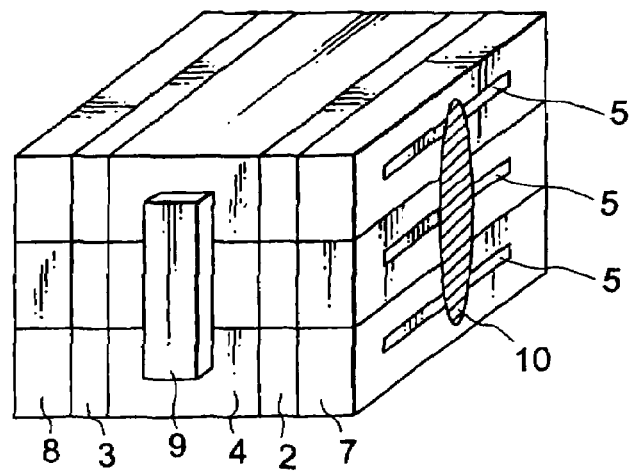

Referring now to FIGS. 2A to 2C, description will be made about a process of fabricating a stacked capacitor by stacking capacitor elements each being the same as that shown in FIG. 1E.

At first, the capacitor elements are stacked together by applying a conductive paste to the electrode layers formed at the cathode portions (FIG. 2A). By this, electrical connection paths are established between the cathode electrode layers of the adjacent capacitor elements while electrical connection paths are established between both end portions of the adjacent capacitor elements through the conductive paste (conductive paste layers 7 and 8) coated at the step of FIG. 1E.

Then, a metal foil 9 is bonded to the cathode electrode layers exposed at the front in the figure so as to be in contact with the cathode electrode layers of all the stacked capacitor elements (FIG. 2B). In FIG. 2B, the metal foil 9 is shown only at the front, but a metal foil may also be bonded at the back in the same manner. Although the metal foil 9 covers only a partial region between the resist bands 2 and 3 in FIG. 2B, a metal foil may be wound around regions between the resist bands 2 and 3 at the front, the back, the upper side, and the lower side in the figure.

Then, according to necessity, metal bonding 10 may be formed by carrying out welding with respect to the three electrodes 5 exposed on the right side in the figure (FIG. 2C). As a method of forming the metal bonding 10, there are, for example, laser welding, ultrasonic welding, electric resistance welding, and so on. By welding a solderable metal when forming the metal bonding 10, it is possible to provide a solderable anode terminal to the stacked capacitor. Although only the metal bonding 10 on the right side is shown in FIG. 2C, metal bonding may also be formed for the electrodes 6 on the left side.

Figure 3A:
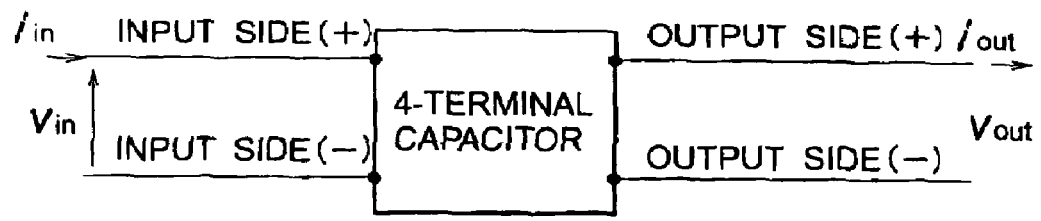
FIGS. 3A and 3B are diagrams for explaining terminals provided at a four-terminal capacitor in the form of a stacked capacitor of this invention.
Figure 3B:
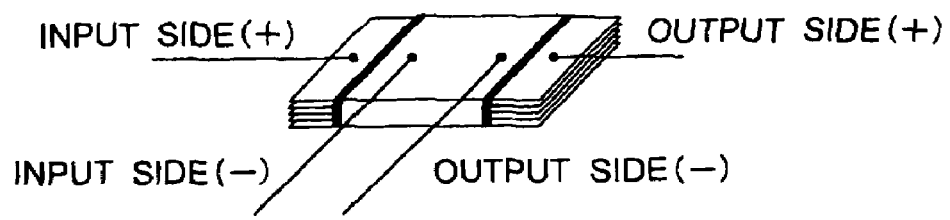

Finally, terminals of the stacked capacitor are provided at each of the metal foil 9 and the metal bonding 10 to produce a complete capacitor. Instead of two terminals, a three-terminal structure may be adopted wherein the metal bondings formed on both sides in the figure are provided with terminals, respectively, and the metal foil 9 is provided with one terminal. Alternatively, a four-terminal structure may be adopted as shown in FIGS. 3A and 3B. It has been confirmed by the present inventors that the most effective low impedance characteristics are obtained with the four-terminal structure. Therefore, the impedance measurement of stacked capacitors of later-described Examples was performed with respect to the four-terminal capacitors. Since an impedance measurement method used for a normal two-terminal capacitor cannot be applied to the impedance measurement of the four-terminal capacitor, S parameters representing characteristics of a four-terminal device were measured and then converted into impedance, for a comparison of characteristics.

EXAMPLE 1

A stacked capacitor of Example 1 will be described. At first, a capacitor element 20 used in the stacked capacitor will be described with reference to FIG. 4. The capacitor element 20 comprises a surface-roughened aluminum foil 21, an aluminum oxide coating layer 22 covering the aluminum foil 21 except its both end portions, resist bands 23 made of an insulating resin and formed on the aluminum oxide coating layer 22 to divide the surfaces of the aluminum foil 21 into anode portions and a cathode portion, and a conductive polymer layer 24, a graphite layer 25, and a cathode-side silver paste layer 26 formed in the order named on the aluminum oxide coating layer 22 between the resist bands 23.

The manufacturing process of the capacitor element 20 is as follows. There is prepared the aluminum foil 21 entirely covered with the aluminum oxide coating layer 22. The resist bands 23 are formed so as to define the belt-shaped cathode portion crossing both surfaces of the aluminum foil 21 and the anode portions at its both end portions. The conductive polymer layer 24, the graphite layer 25, and the cathode-side silver paste layer 26 are formed at the cathode portion. Then, the aluminum oxide coating layer 22 is removed from the anode portions by polishing or the like.

Figure 5:
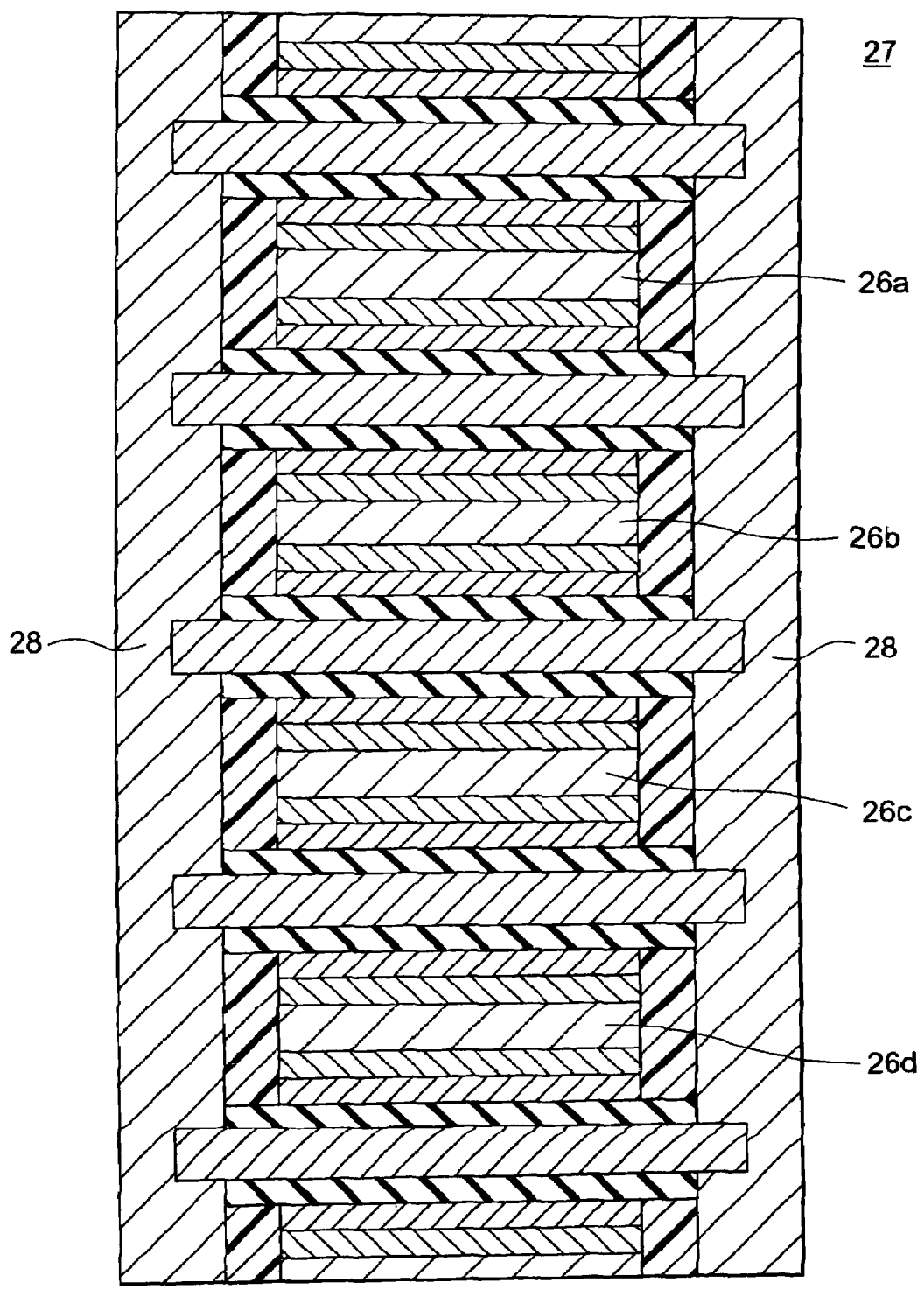
FIG. 5 is a sectional view of the stacked capacitor 27.

As shown in FIG. 5, a stacked capacitor 27 is formed by stacking five capacitor elements 20. Each of cathode-side silver paste layers 26a, 26b, 26c, and 26d between the capacitor elements 20 is an integration of the cathode-side conductive paste layers of the adjacent capacitor elements 20 by heat curing after the stacking and serves to electrically connect the cathode portions of the adjacent capacitor elements 20 to each other. By this, conductive paths are formed each between the facing silver paste layers of the adjacent capacitor elements 20. Further, a conductive path connecting in parallel the cathodes of the capacitor elements 20 to each other is formed by the integrated silver paste layers on sides of the stacked capacitor 27. The latter conductive path corresponds to the metal foil 9 shown in FIGS. 2B and 2C.

Further, the end portions of the aluminum foils 21 projecting outward from the resist bands 23 are covered with anode-side conductive paste layers 28. The anode-side conductive paste layers 28 are also heat-cured so that the anode portions of the capacitor elements 20 are integrated together. The anode-side conductive paste layers 28 electrically connect the five aluminum foils 21 to each other.

Finally, for enabling handling at the time of mounting, the stacked capacitor 27 is subjected to casing and attached with mounting terminals so as to be a product.

EXAMPLE 2

Figure 4:
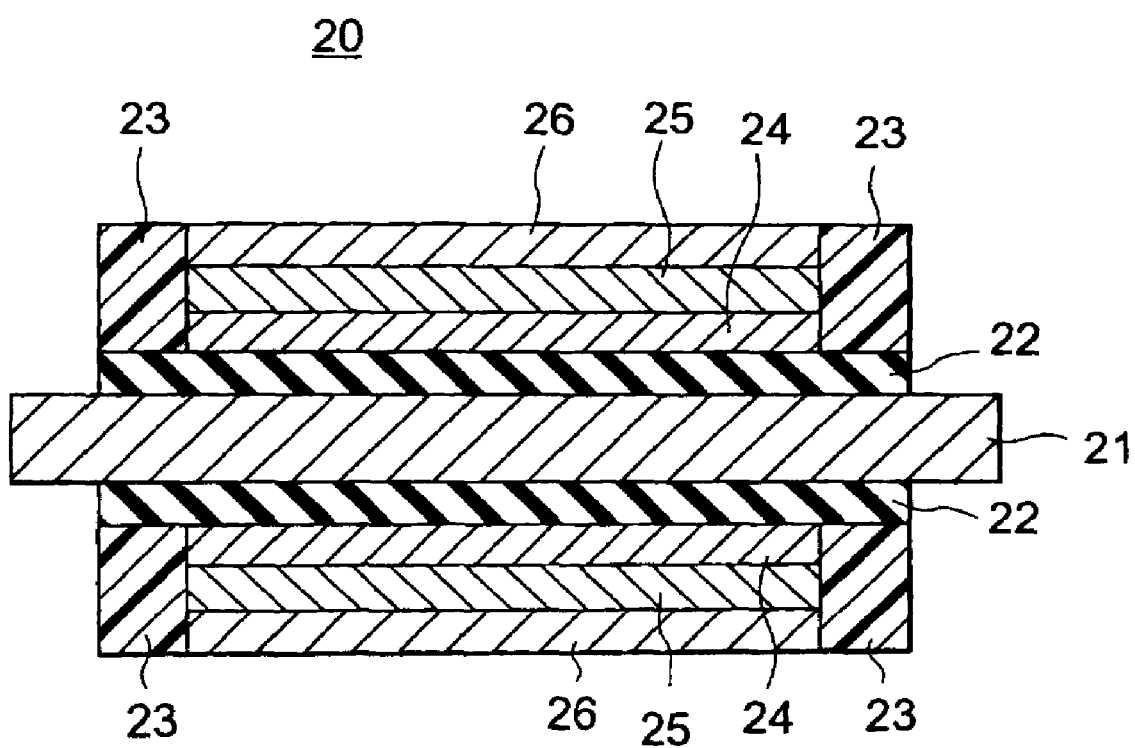
FIG. 4 is a sectional view of a capacitor element 20 being one example of a capacitor element forming a stacked capacitor 27 of Example 1 of this invention.
Figure 6:
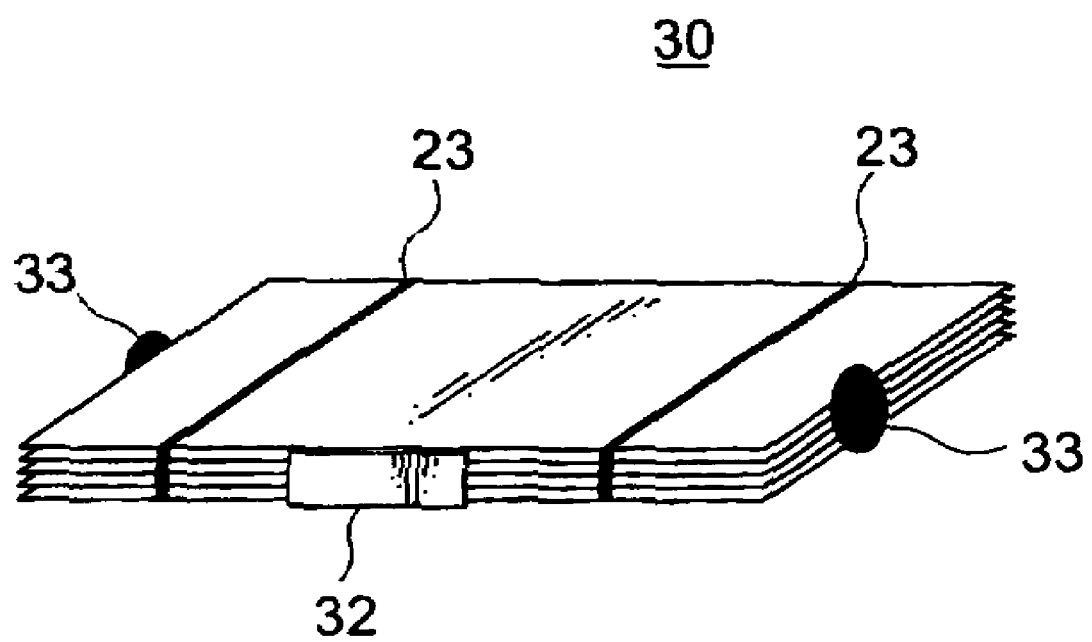
FIG. 6 is a perspective view of a stacked capacitor 30 of Example 2.
Figure 7:
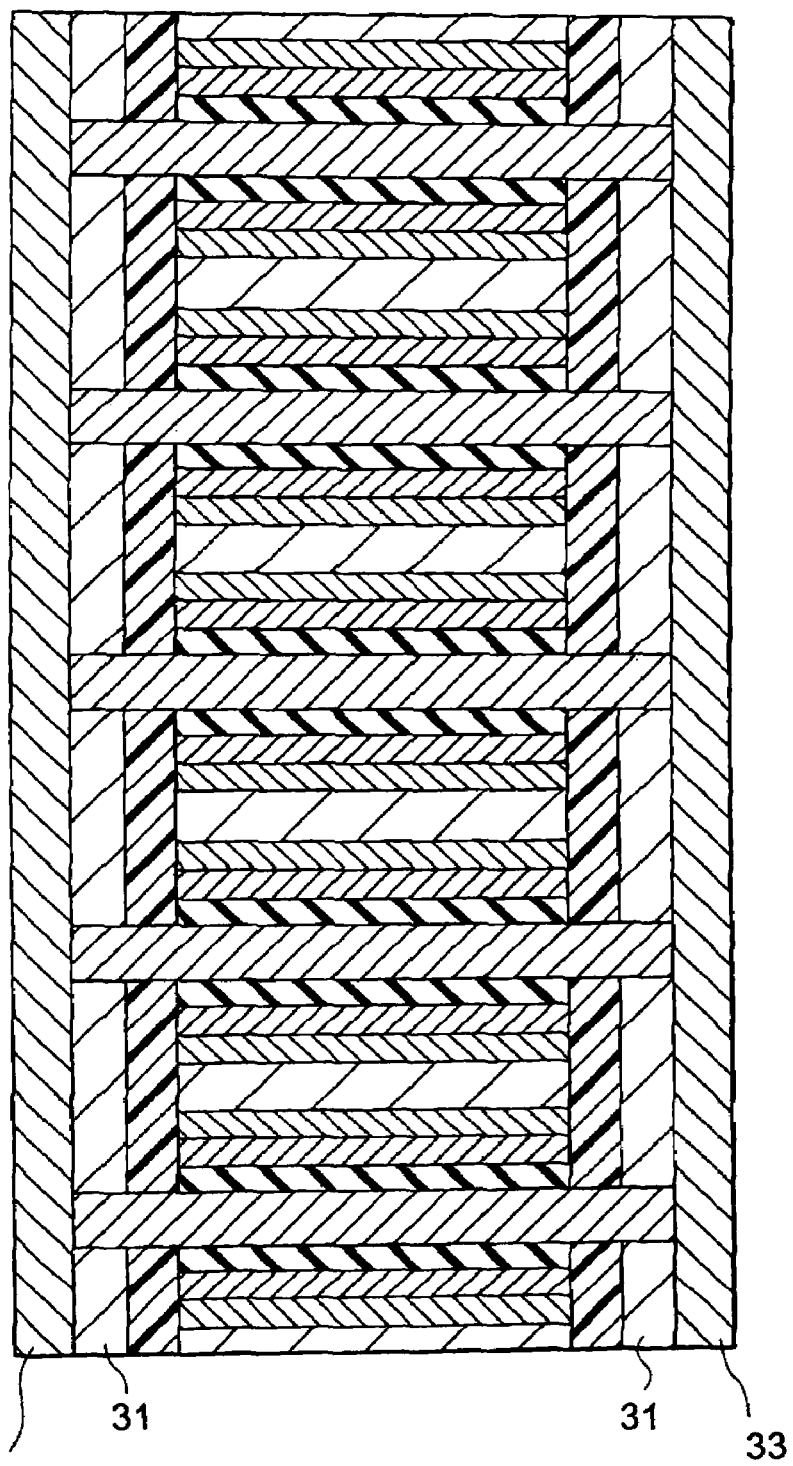
FIG. 7 is a sectional view of the stacked capacitor 30 of Example 2.

A stacked capacitor 30 of Example 2 is shown in FIG. 6 and FIG. 7 and will be described. Since the stacked capacitor 30 is formed by using capacitor elements 20 each of which is shown in FIG. 4 and described in Example 1, detailed explanation of thereof is omitted. Copper paste layers 31 are applied to the capacitor element 20 of FIG. 1 at both end portions of each aluminum foil 21.

In addition, a silver paste is coated on a cathode-side silver paste layer 26, being the outermost layer of the cathode portion, of one of the capacitor elements 20, then the cathode-side silver paste layer 26 is aligned with and overlaid on a cathode-side silver paste layer 26 of another capacitor element 20. Then, heat is applied to the capacitor elements to heat-cure the paste to integrate the layers 26 together. By repeating this, five capacitor elements 20 are stacked together.

Then, a silver paste is applied to center portions interposed between resist bands 23 of the five stacked capacitor elements and the anode portions respectively, and the silver paste is heat-cured.

Then, as shown in FIG. 6, a silver paste is applied to both sides of the stacked capacitor cathode portions and copper foil strips 32 are bonded thereto. By this, the cathodes of the individual capacitor elements are electrically connected to each other at the shortest distance through the copper foil strips 32 having a very low resistance.

Then, the anode terminal portions are integrated together by laser welding. In this event, as shown in FIGS. 6 and 7, the copper paste layers 31 coated at the anode terminal portions before the stacking are melted along with the aluminum foils 21, thereby forming metal bondings 33. Therefore, it is possible to reduce the connection resistance as compared with the case where only the aluminum foils 21 are laser-welded.

Finally, for enabling handling at the time of mounting, the stacked capacitor 30 is subjected to casing and attached with mounting terminals so as to be a product.

EXAMPLE 3

Figure 8:
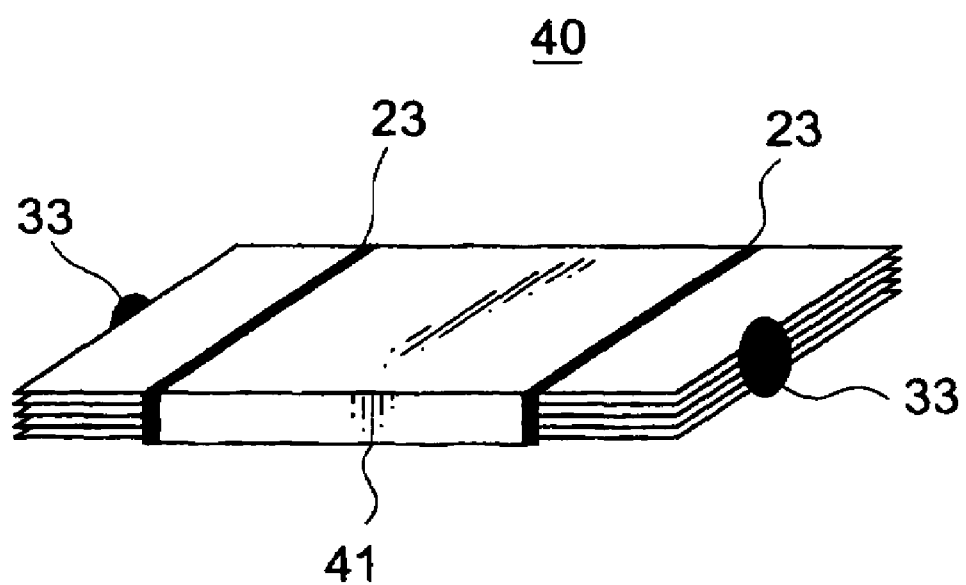
FIG. 8 is a perspective view of a stacked capacitor 40 of Example 3.

A stacked capacitor 40 of Example 3 will be described with reference to FIG. 8. As compared with the foregoing stacked capacitor 30, the stacked capacitor 40 differs in that a copper foil belt 41 is used instead of the copper foil strips 32. Capacitor elements 20 are the same as those in Examples 1 and 2.

In Example 2, the silver paste is applied to both sides of the stacked capacitor cathode portions and the copper foil strips 32 are bonded thereto. On the other hand, in this Example, as shown in FIG. 8, a silver paste is applied in a belt shape around the stacked capacitor cathode portions and the copper foil belt 41 is bonded thereto. In this Example, the thickness of the copper foil belt 41 is set to 10 µm. However, it is preferable to increase the thickness thereof according to the number of capacitor elements 20 to be stacked.

EXAMPLE 4

A stacked capacitor of Example 4 differs from the stacked capacitor 40 of Example 3 in that the silver paste applied around the cathode portions is replaced with a copper paste. Herein, as the copper paste, use is made of one whose resistivity after curing becomes 1 mΩ·cm or less. Generally, the copper paste is lower in price as compared with the silver paste and, therefore, is advantageous in terms of production cost.

EXAMPLE 5

Figure 9:
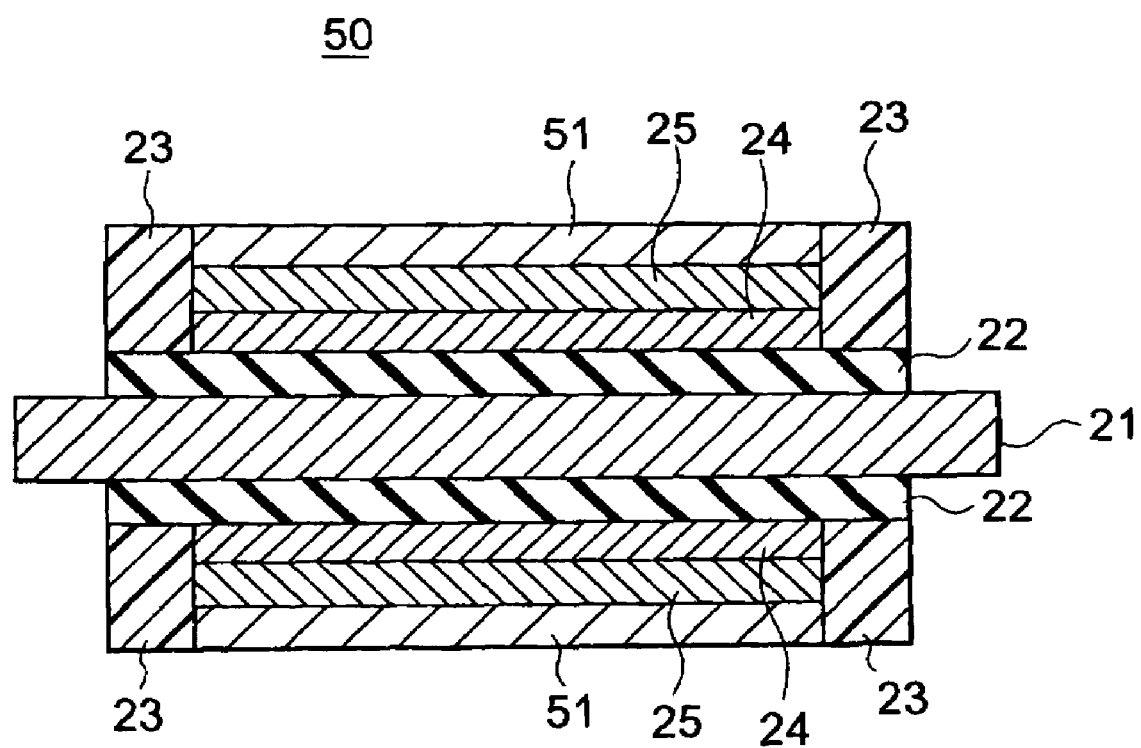
FIG. 9 is a sectional view of a capacitor element 50 of Example 5.

In Example 5, a stacked capacitor is fabricated by stacking capacitor elements 50 as shown in FIG. 9. As compared with the capacitor element 20 shown in FIG. 4, the capacitor element 50 differs in that, instead of forming the conductive paste layer 26, copper is plated to form a copper plating layer 51 after forming the graphite layer 25.

Such capacitor elements 50 are stacked together and a copper foil belt 41 covers around the cathode portions like in Example 3.

In the stacked capacitor of this Example, the resistivity of the cathode portions is reduced to 1/10 or less by replacing the silver paste with the copper plating at the cathode portions and, therefore, the impedance can be further reduced.

EXAMPLE 6

Figure 10:
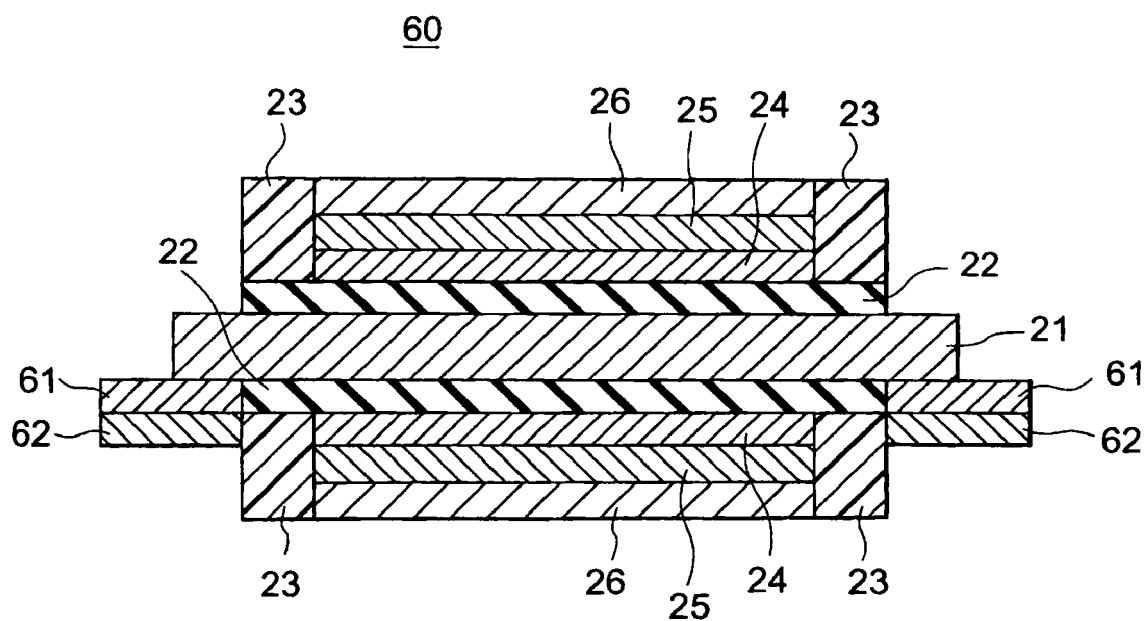
FIG. 10 is a sectional view of a capacitor element 60 of Example 6.

In this Example, a stacked capacitor is fabricated by stacking capacitor elements 60 as shown in FIG. 10. The capacitor element 60 is similar to the capacitor element 20 shown in FIG. 4, but differs in that a copper plate 62 having one surface applied with nickel plating 61 is welded by resistance welding to each of both end portions of an aluminum foil 21 where an oxide coating layer 22 is removed. By the welding through the nickel plating 61, an excellent welding state with the aluminum foil 21 is realized so that the reliability of a welded portion is improved. The copper plate 62 may be welded by ultrasonic welding, electric resistance welding, laser welding, or the like.

Figure 11:
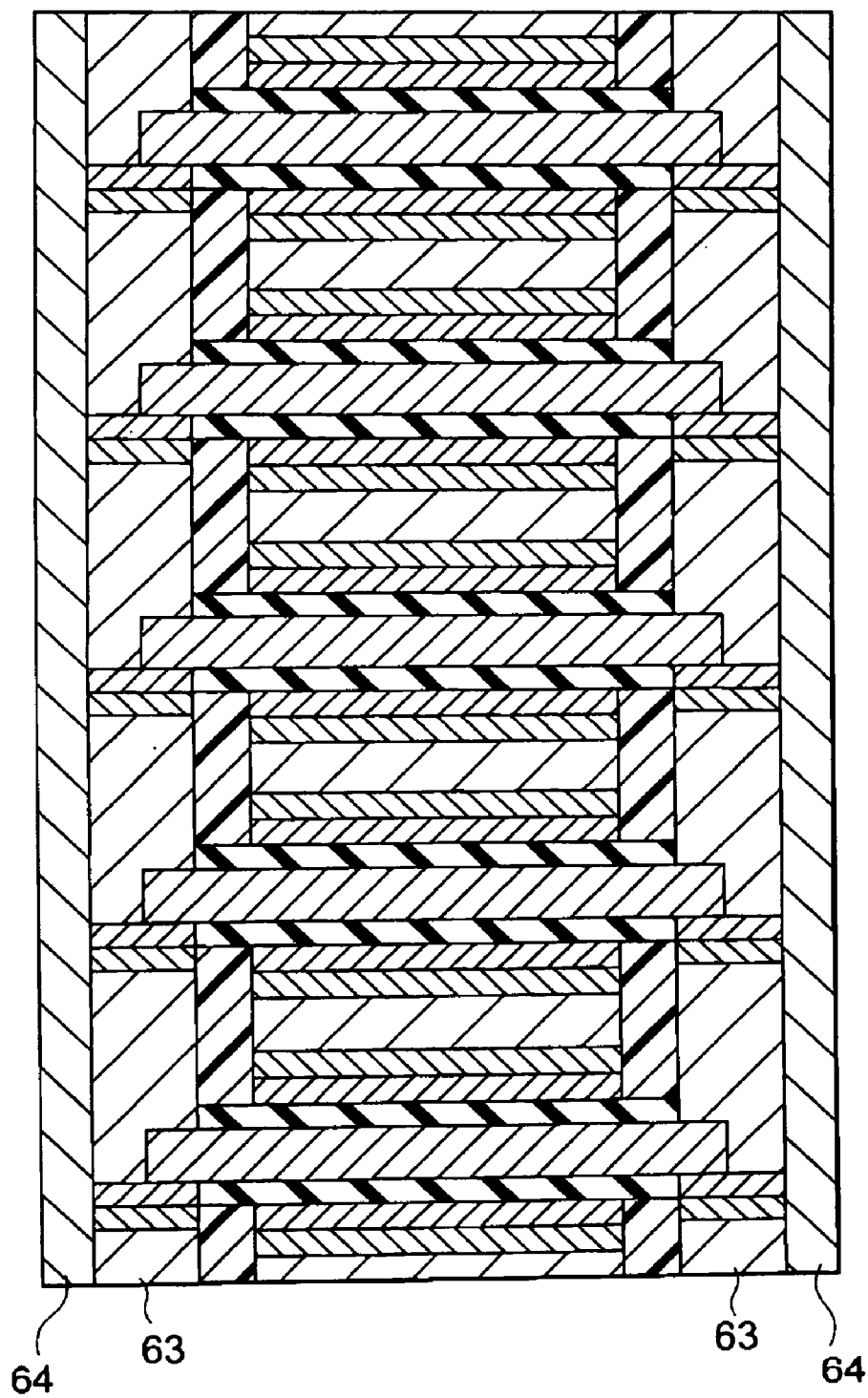
FIG. 11 is a sectional view of a stacked capacitor of Example 6.

In this Example, after stacking such capacitor elements 60 together, a copper foil belt 41 covers around the cathode portions like in Example 3. Then, as shown in FIG. 11, the copper plates 62 serving as anode portions are covered with a conductive paste 63 and metal bondings 64 are formed by laser welding or the like.

EXAMPLE 7

Figure 12:
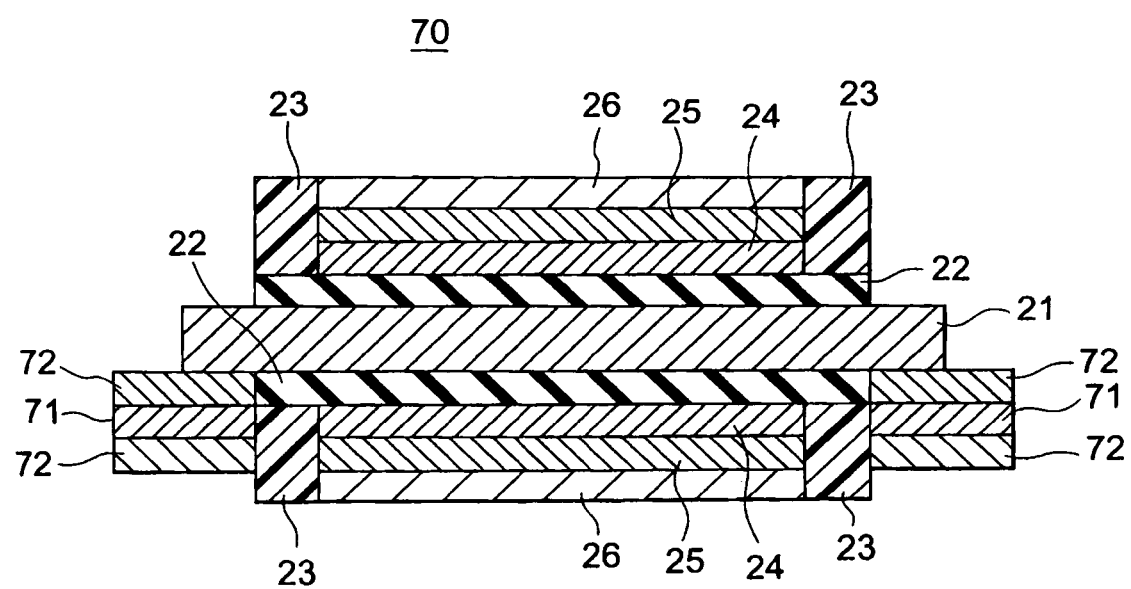
FIG. 12 is a sectional view of a capacitor element 70 of Example 7.

Referring to FIG. 12, example 7 will be explained. In Example 6, the copper plates 62 each having one surface applied with the nickel plating 61 are welded to the aluminum foil 21. On the other hand, in a capacitor element 70 of this Example, copper plates 71 each having both surfaces applied with nickel plating 72 are welded to an aluminum foil 21. Since the plating is applied only to the one surface in Example 6, it is necessary to confirm the orientation of the copper plate 62 when performing the welding operation. On the other hand, since the plating is applied to both surfaces in this Example, such confirmation is not required. Therefore, the welding operation can be easily carried out.

EXAMPLE 8

In Examples 6 and 7, the copper plates each having one surface or both surfaces applied with the nickel plating are welded to the aluminum foil 21. On the other hand, in Example 8, copper plates each having one surface or both surfaces applied with silver plating are welded to an aluminum foil 21. That is, in the case of one surface applied with the silver plating, a capacitor element has a structure in which the nickel plating 61 is replaced with the silver plating in the capacitor element 60 shown in FIG. 10, while, in the case of both surfaces applied with the silver plating, a capacitor element has a structure in which the nickel plating 72 is replaced with the silver plating in the capacitor element 70 shown in FIG. 12.

In Examples 6 and 7, the weldability is improved by welding to the aluminum foil 21 through the nickel plating. Likewise, since the welding to the aluminum foil 21 is carried out through the silver plating in this Example, the weldability is improved. In the case where the silver plating is applied to both surfaces, the operation is facilitated like in Example 7.

Further, paying attention to an end portion of the anode portion, the silver plating portion is exposed at the outermost surface of the anode portion. Accordingly, at the stage of mounting, the mounting can be easily carried out by the use of a recently developed silver paste for substitution of solder.

EXAMPLE 9

Figure 13:
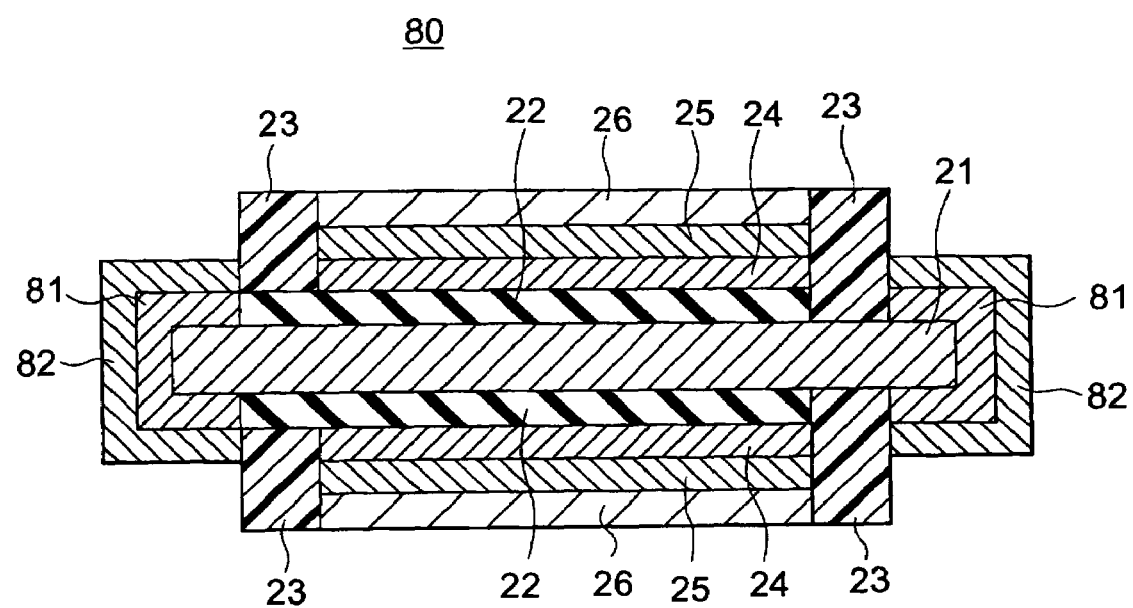
FIG. 13 is a sectional view of a capacitor element 80 of Example 9.

In Examples 6, 7, and 8, the copper plate applied with the nickel or silver plating is welded to the end portion of each anode portion. On the other hand, in a capacitor element 80 of Example 9, as shown in FIG. 13, evaporated platinum film 81 is formed at an end portion of each anode portion and, then, copper plating 82 is applied to the evaporated platinum film 81.

Figure 14:
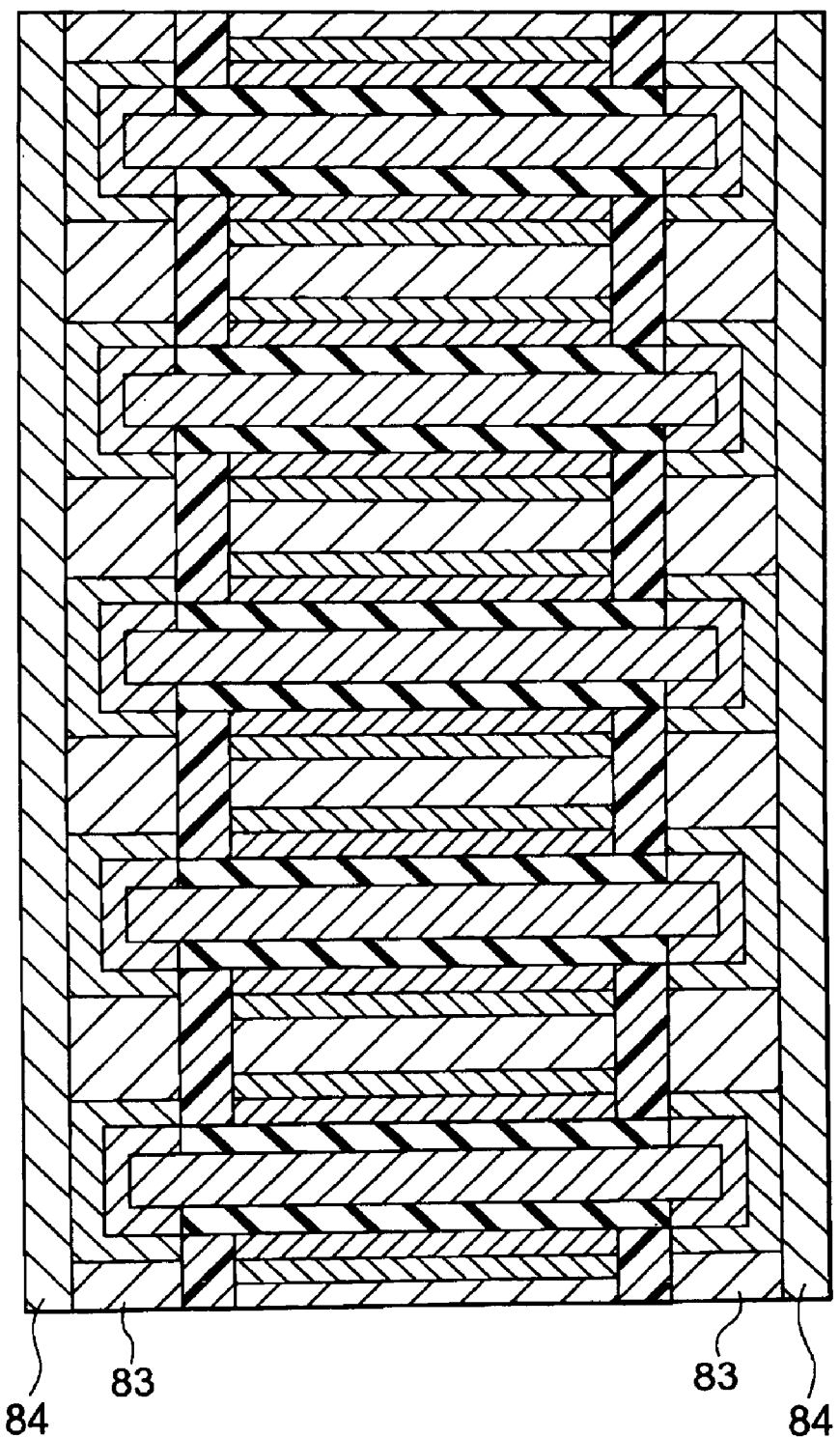
FIG. 14 is a sectional view of a stacked capacitor fabricated by stacking capacitor elements 80 of Example 9.

The capacitor elements 80 are stacked together and a copper foil belt 41 is wound around the center portions, including cathode portions, of the capacitor elements 80 like in Example 3. Then, as shown in FIG. 14, the anode portions are covered with a conductive paste 83 and metal bondings 84 are formed by laser welding or the like.

In Examples 6 to 8, the copper plate is welded to the anode portion. On the other hand, in this Example, the evaporation and plating are carried out with respect to the anode portion. Therefore, this Example is advantageous in that the productivity is excellent as compared with the former Examples. Further, since the copper plate welding is not carried out, there is an advantage that the connection reliability is high.

EXAMPLE 10

Figure 15:
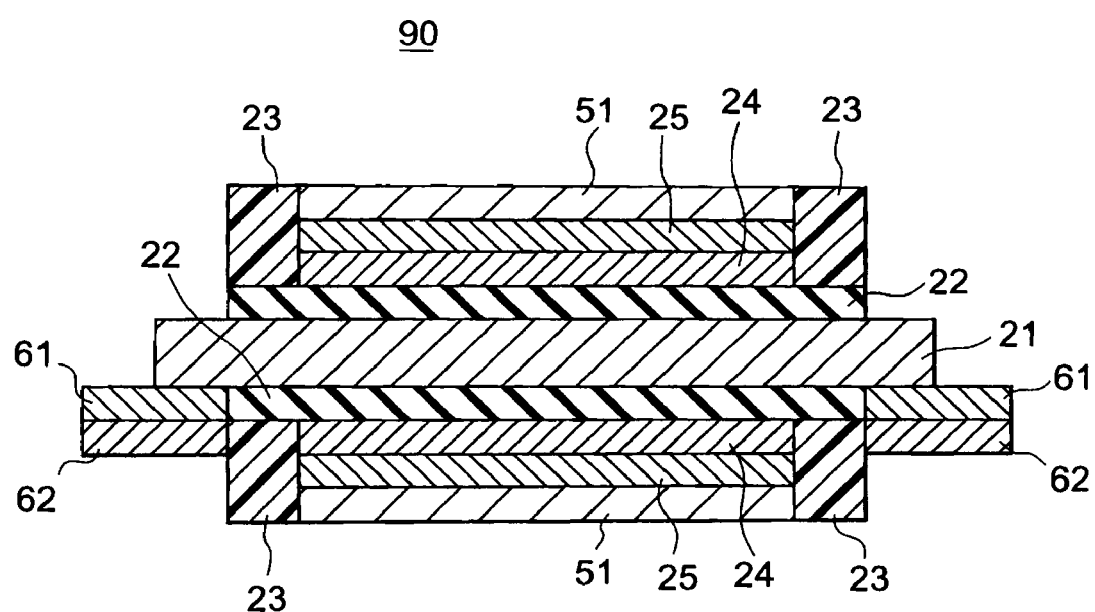
FIG. 15 is a sectional view of a capacitor element 90 of Example 10.

Referring to FIG. 15, a capacitor element 90 of this Example has a structure in which a copper plating layer 51 is provided at a cathode portion like in Example 5 and a copper plate 62 having one surface applied with nickel plating 61 is welded to each anode portion like in Example 6.

Figure 16:
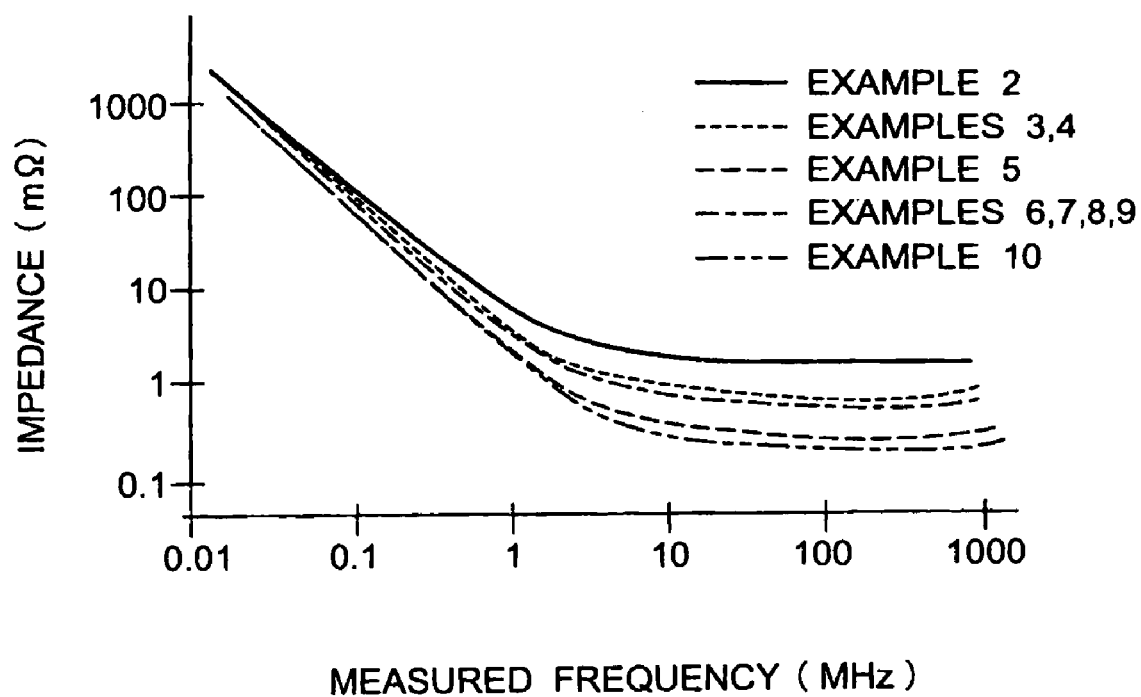
FIG. 16 is a graph for explaining impedance-frequency characteristics of Examples 2 to 10.

FIG. 16 shows impedance-frequency characteristics of the foregoing Examples 2 to 10. In Example 2, the cathode portions of the individual capacitor elements are connected to each other through the conductive paste. On the other hand, in Examples 3 and 4, the metal foil belt is bonded onto such a conductive paste to thereby reduce the resistance across the cathode portions of the individual capacitor elements. In Examples 6 to 9, the resistance is reduced by applying the plating, evaporation, and so on to the anode portions. In Example 5, the resistivity of the cathode portions is reduced to $1/10$ or less by replacing the silver paste with the copper plating at the cathode portions and, therefore, the impedance is further reduced. In Example 10, the conductive paste is replaced with the plating at the cathode portions like in Example 5 and the plating and so on are applied to the anode portions like in Example 6, so that the total impedance is further reduced.

While this invention has been described in terms of the embodiments, it is a matter of course that this invention is not to be limited thereto, but modification or improvement can be applied thereto within the general knowledge of a person skilled in the art.

For example, in the foregoing Examples, the description has been made about the case where the five capacitor elements are stacked to form the stacked capacitor. However, this invention is not limited thereto. It is obvious to a person skilled in the art that less or more capacitor elements may be stacked to form a stacked capacitor.

Example 10 is the combination of Examples 5 and 6. However, it is readily understood by a person skilled in the art that Example 5 may be combined with any of Examples 7 to 9.

In the foregoing Examples, the stacked capacitor has been described to have the four-terminal structure. However, this invention is not limited thereto. It is obvious to a person skilled in the art that this invention is also applicable to a stacked capacitor having a two-terminal structure or a three-terminal structure.

What is claimed is:

1. A stacked capacitor formed by stacking a plurality of capacitor elements, wherein each of said capacitor elements comprises a conductor plate, a first band including an insulator and disposed around said conductor plate, a second band including an insulator and disposed around said conductor plate so as to be substantially parallel to said first band, an insulating coating covering a region of said conductor plate sandwiched between said first and second bands, a first electrode including an electrolytic material and formed on said insulating coating, and a second electrode including said conductor plate and formed on an outer side of at least one of said first and second bands, said first electrode of said capacitor elements are electrically connected to each other through both of a first conductive path formed by adjoining the facing two first electrodes of the adjacent two capacitor elements and a second conductive path connecting in parallel said first electrodes of said plurality of capacitor elements to each other, and said second electrodes are electrically connected to each other through a third conductive path connecting in parallel said second electrodes to each other.

2. A stacked capacitor according to claim 1, wherein said third conductive path comprises metal bonding formed by welding between said second electrodes.

3. A stacked capacitor according to claim 1, wherein said second conductive path comprises a conductive paste covering said first electrodes and a metal member covering at least part of said conductive paste.

4. A stacked capacitor according to claim 3, wherein said metal member is a metal foil disposed around said conductor plate between said first and second bands.

5. A stacked capacitor according to claim 1, wherein each of said first electrodes has a conductive paste layer as an outermost layer.

6. A stacked capacitor according to claim 1, wherein each of said first electrode layers has a plating layer as an outermost layer.

7. A stacked capacitor according to claim 1, wherein each of said capacitor elements comprises a metal plate having at least one surface applied with plating and joined to at least one of said second electrodes, and said metal plate is joined to said second electrode through its surface applied with the plating.

8. A stacked capacitor according to claim 7, wherein said plating is applied to both surfaces of said metal plate.

9. A stacked capacitor according to claim 7, wherein said plating is nickel plating.

10. A stacked capacitor according to claim 7, wherein said plating is silver plating.

11. A stacked capacitor according to claim 1, wherein at least one of said second electrodes of each of said capacitor elements is covered with evaporated metal film and said evaporated metal film is covered with plating.

12. A stacked capacitor according to claim 1, further comprising two terminals electrically connected to said first electrodes of said capacitor elements and two terminals electrically connected to said second electrodes.

13. A fabrication method of a stacked capacitor having a plurality of capacitor elements stacked together, comprising the steps of:

preparing the capacitor elements each including a first band and a second band on a conductor plate covered with an insulating coating, said first band including an insulator and disposed around said conductor plate and said second band including an insulator and disposed around said conductor plate so as to be substantially parallel to said first band, a cathode layer on said insulating coating between said first and second bands, and an anode including said conductor plate on an outer side of at least one of said first and second bands;

forming a first conductive path by adjoining the facing two cathode layers of the adjacent two capacitor elements and a second conductive path connecting in parallel said cathode layers of said plurality of capacitor elements to each other; and forming a third conductive path connecting in parallel said anode to each other.

14. A fabrication method of a stacked capacitor according to claim 13, wherein said step of forming said third conductive path comprises a step of forming metal bonding by welding between said anode.

15. A fabrication method of a stacked capacitor according to claim 13, wherein said step of forming said second conductive path comprises a step of covering said cathode layers with a conductive paste and covering at least part of said conductive paste with a metal member.

16. A fabrication method of a stacked capacitor according to claim 15, wherein said metal member includes a metal foil disposed around said conductor plate between said first and second bands.

17. A fabrication method of a stacked capacitor according to claim 13, wherein each of said cathode layers has a conductive paste layer as an outermost layer.

18. A fabrication method of a stacked capacitor according to claim 13, wherein each of said cathode layers has a plating layer as an outermost layer.

19. A fabrication method of a stacked capacitor according to claim 13, wherein said preparing step further comprises the steps of:

applying plating to at least one surface of a metal plate; and joining said metal plate to said anode through its surface applied with the plating.

20. A fabrication method of a stacked capacitor according to claim 19, wherein said plating is applied to both surfaces of said metal plate.

21. A fabrication method of a stacked capacitor according to claim 19, wherein said plating is nickel plating.

22. A fabrication method of a stacked capacitor according to claim 19, wherein said plating is silver plating.

23. A fabrication method of a stacked capacitor according to claim 13, wherein said preparing step further comprises the steps of:

covering at least one of said anode of each capacitor element with evaporated metal film; and covering said evaporated metal film with plating.

* * * * *